United States Patent [19]

Shirato

[11] Patent Number: 5,320,664
[45] Date of Patent: Jun. 14, 1994

[54] METHOD OF PREPARING METAL ELEMENT ADSORBENT AND METHOD OF ADSORBING AND SEPARATING METAL ELEMENT USING THE SAME

[75] Inventor: Wataru Shirato, Ibaraki, Japan

[73] Assignee: Mitsubishi Nuclear Fuel Company, Ltd., Tokyo, Japan

[21] Appl. No.: 906,273

[22] Filed: Jun. 26, 1992

[30] Foreign Application Priority Data

Jul. 9, 1991 [JP] Japan ................................. 3-194960
Dec. 12, 1991 [JP] Japan ................................. 3-351676

[51] Int. Cl.$^5$ ................................. C22B 1/00
[52] U.S. Cl. ................................. 75/711; 252/315.1; 252/322; 502/400; 502/401
[58] Field of Search ................................. 502/400, 401; 252/315.1, 184, 322, DIG. 108; 75/711

[56] References Cited

U.S. PATENT DOCUMENTS 974,448  11/1910  Supf ................................. 106/135
1,545,321  7/1925  Hebden ................................. 502/1

*Primary Examiner*—Peter D. Rosenberg
*Attorney, Agent, or Firm*—McAulay Fisher Nissen Goldberg & Kiel

[57] ABSTRACT

A metal element adsorbent in the form of a hydrogel prepared by treating a condensed tannin with a base, in the presence or absence of an aldehyde so as to avoid precipitation of cross-linked tannin and produce a hydrogel. The inventive adsorbent exhibits high adsorption properties for metal elements and a low flow resistivity when used in a packed column. Methods for use of the inventive adsorbent are disclosed.

26 Claims, 7 Drawing Sheets

METHOD OF PREPARING METAL ELEMENT ADSORBENT AND METHOD OF ADSORBING AND SEPARATING METAL ELEMENT USING THE SAME

BACKGROUND OF THE INVENTION

I. Field of the Invention

This invention relates to a method of preparing a metal element adsorbent which can adsorb actinides such as uranium, thorium, transuranium elements, and the like; heavy metal elements such as cadmium, lead, chromium, mercury, iron, etc.; or metal elements such as cobalt, cesium, strontium, and the like.

Also, it relates to a method of adsorbing and separating the metal element from a solution containing the metal element by using the adsorbent.

II. Description of the Related Art

Nuclear fuel elements such as uranium, thorium, etc. are contained in the waste liquid effluent from nuclear fuel processing facilities. The prior art discloses a method of preparing an adsorbent for these nuclear fuel elements which is made from "kaki-shibu", that is, persimmon juice (Unexamined Published Japanese Patent Applications No. 63-61998 and No. 1-155947). This adsorbent is a hydrogel composition which is produced by reacting a kaki-shibu with an aldehyde or an acid such as sulfuric acid, phosphoric acid, etc., thereby causing the gelation of the persimmon tannin.

The present applicant has previously filed a patent application regarding a method for producing an adsorbent of insoluble tannin which comprises dissolving a tannin powder in an aqueous aldehyde solution, adding ammonia to the resulting solution to form a precipitate, and aging the precipitate to obtain the insoluble tannin (Unexamined Published Japanese Patent Application No.3-206094).

In the former method of preparing a hydrogel composition, the raw material is limited to kaki-shibu because tannins extracted from a natural product other than kaki-shibu will not react with an aldehyde or an acid, wherby a gel will not be formed.

The latter method of preparing an adsorbent of an insoluble tannin is problematic because the insoluble tannin is made from a tannin powder which is an aggregate of finely divided particles. When the insoluble tannin is packed into a column of a waste disposal plant and waste liquid is passed through the column, the insoluble tannin changes to the form of finely divided particles, thereby increasing the flow resistivity. For example, a waste liquid will pass through a column packed with an adsorbent consisting of the insoluble tannin at a space velocity of 17 $h^{-1}$ at most. This rate means that it is insufficient to increase the throughput or processing ability of the waste liquid.

SUMMARY OF THE INVENTION

An object of this invention is to provide a new metal element adsorbent with a high adsorption ability and low flow resistivity when used in a packed column. Another object of this invention is to provide a method for making the inventive adsorbent by forming a gel composition using a variety of condensed tannins which are plentiful in nature.

Another object of this invention is to provide a method of adsorbing and separating a metal element wherein a metal element can be efficiently recovered by eluting the metal element from the adsorbent.

We have discovered a novel adsorbent in the form of a hydrogel which is formed from treatment of a condensed tannin, the adsorbent exhibiting high adsorption properties for metal elements and low flow resistivity when used in a packed column. The inventive gel composition is advantageous because it can be obtained from a variety of plentiful, naturally occurring tannins.

These methods and procedures include:

The first method comprises the steps of dissolving a condensed tannin powder in aqueous ammonia, mixing the resulting solution with an aqueous aldehyde solution to form a gel composition, and, either aging at room temperature or heating the composition obtained to stabilize the compound;

The second method comprises the steps of mixing aqueous ammonia with an aqueous aldehyde solution, dissolving a condensed tannin powder in the mixed liquid, and heating the resulting solution to yield a stabilized gel composition;

The third method comprises the steps of dissolving a condensed tannin powder in aqueous ammonia having a pH of 8 or more, mixing the resulting solution with hexamethylenetetramine, and heating the mixed liquid to obtain a stabilized gel composition;

The fourth method comprises the steps of mixing a condensed tannin powder into aqueous hexamethylenetetramine solution, adding aqueous ammonia to the mixed liquid so that the resulting liquid has a pH of 8 or more, to dissolve the tannin powder, and heating the resulting solution to form a stabilized gel composition;

The fifth method comprises the steps of dissolving a condensed tannin powder in an aqueous alkali metal hydroxide solution having a pH ranging from 7 to 10, mixing the resulting solution with an aqueous aldehyde solution, and heating the mixed liquid to form a stabilized gel composition;

The sixth method comprises the steps of dissolving a condensed tannin powder in an aqueous alkali metal hydroxide solution having a pH ranging from 7 to 10, mixing the resulting solution with hexamethylenetetramine, and heating the mixed liquid to form a stabilized gel composition;

The seventh method comprises the steps of dissolving a condensed tannin powder in an aqueous hexamethylenetetramine solution, adding an aqueous alkali metal hydroxide solution to the mixed liquid so that the mixed liquid has a pH ranging from 7 to 10, to dissolve the tannin powder, and heating the resulting solution to form a stabilized gel composition.

As used herein, "stabilization" means that the gel composition is insoluble in water, an acid, or an alkali, and "a stabilized gel composition" means that the composition is insoluble in water, an acid, or an alkali.

In accordance with the invention, a metal element is adsorbed and separated from a solution thereof by contacting the inventive adsorbent with a solution containing the metal element for a time period sufficient to allow this metal in the solution to adsorb onto the adsorbent. The adsorbent can be pulverized first to increase its surface area. After the contacting step, the metal may be recovered by contacting the metal containing absorbent with an eluant, e.g., a dilute mineral acid.

DESCRIPTION OF THE PREFERRED EMBODIMENT

Figure 1:
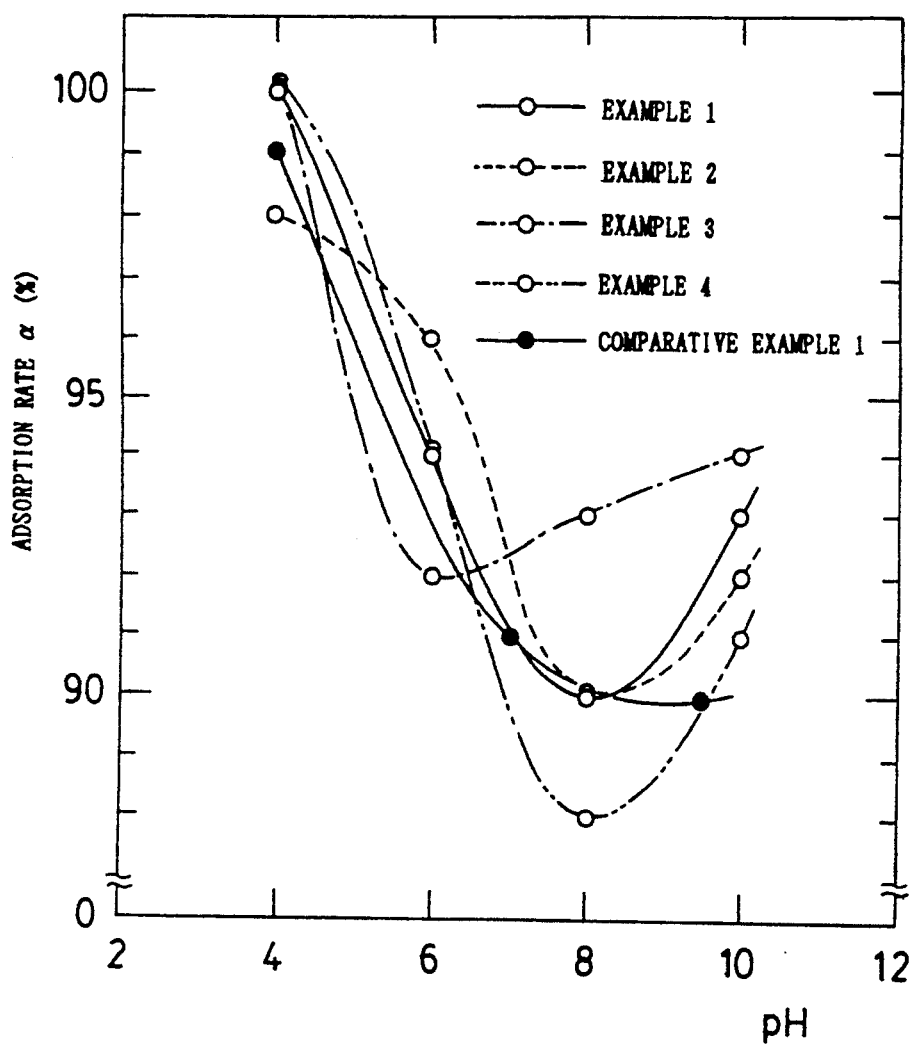
FIG. 1 is a graph showing the result of adsorption test 1 according to this invention.

More particularly, metal elements which may be adsorbed with the inventive adsorbent include uranium, thorium, transuranium elements, and the like; heavy metal elements, such as, cadmium, lead, chromium, mercury, iron, etc.; or metal elements, such as, cobalt, cesium, strontium, and the like.

Suitable for use as tannin powder in the inventive method is condensed tannin. Condensed tannin used herein means a tannin which reacts with an acid to form an anthocyanidin dyestuff. Such condensed tannin is made from quebracho, wattle, mangrove, spruce, gambier, acacatechin, oak bark, and the like, by conventional means, such as extraction. The condensed tannin does not include kaki-shibu.

In the first, second and fifth methods, the aldehyde is preferably an aqueous solution of formaldehyde, acetaldehyde, or glutearaldehyde may be used. Aqueous formaldehyde solution is preferable because it hastens the generation of a gel composition, and improves the mechanical strength of the gel composition.

Alkali metal hydroxides suitable for use in the fifth, sixth, and seventh methods include sodium hydroxide, potassium hydroxide, and lithium hydroxide, and the like.

In the first inventive method, preferably the mixing ratios of the components are: condensed tannin powder, 3 to 35 wt. %, ammonia, 33 to 35 wt. %, aldehyde, 30 to 62 wt. % (based on the total amount of the three components). A typical example is: tannin powder, 24 wt. %, ammonia, 33 wt. %, and aldehyde, 43 wt. %.

The ratio of the condensed tannin powder is especially important. When the tannin powder is less than 3 wt. %, it is difficult for it to be gelatinized. When it exceeds 35 wt. %, it tends to become a powdery composition.

The resulting gel composition does not dissolve in water in the form as it is. However, since the gel composition dissolves in acid or alkali, the gel composition is preferably stabilized by one of the following two methods. One method comprises leaving the gel composition for 3 to 4 days or more under room temperature of 20° to 25° C. to age it. Another method comprises heating the gel composition to stabilize it promptly. If the heating temperature is increased, the heating time can be shortened. For instance, when the gel composition is heated at 70° C., it will require at least 30 minutes to be stabilized. When the composition is heated at 80° C., it will only require 15 minutes.

In the second inventive method, an aqueous ammonia and an aqueous aldehyde solution are mixed, and then a condensed tannin powder is dissolved in the resulting mixture. The same mixing ratio as that of the first method can be adopted. After stirring for about 5 to 10 minutes, the tannin powder dissolves completely. Then, the resulting solution is heated in the same manner as in the first method to produce a stabilized gel composition. Thus, gelatinization and stabilization are done at the same time by this heating.

In the third inventive method, a condensed tannin powder is first dissolved in aqueous ammonia having a pH of 8 or more. If the pH of the solution is 8 or less the tannin powder will not easily dissolve in the aqueous ammonia.

The mixing ratio of the condensed tannin powder depends on the pH value of aqueous ammonia. For instance, it is desirable to mix a condensed tannin powder of 1 to 15 wt. % with aqueous ammonia of pH 8. If the tannin powder is less than 1 wt. %, it is difficult to gelatinize. When the pH of the aqueous ammonia is raised, it is possible to increase the mixing amount of the tannin powder up to 15 wt. % or more.

Hexamethylenetetramine is mixed with the aqueous ammonia solution which dissolves the tannin powder in an amount of at least 0.5 wt. %. Thus, the resulting solution is heated in the same manner as the second method to produce a stabilized gel composition.

In the fourth inventive method, a condensed tannin powder is mixed with an aqueous hexamethylenetetramine solution containing at least 0.5 wt. % hexamethylenetetramine. The mixing ratio of the tannin powder and the hexamethylenetetramine solution is the same as that of the third method.

At this point, the tannin powder does not yet dissolve in the hexamethylenetetramine solution.

However, aqueous ammonia is added to the mixture to make the pH of the mixture 8 or more, causing the tannin powder to completely dissolve. Finally, the resulting solution is heated in the same manner as the second and third methods to produce a stabilized gel composition.

In the fifth inventive method, a condensed tannin powder is dissolved in an aqueous alkali metal hydroxide solution having a pH ranging from 7 to 10. If the pH is less than 7, the tannin powder will not easily dissolve. If the pH is more than 10, the resulting gel composition will be unstable and will easily dissolve in water.

The preferred ratio of the mixture is 1 to 40 wt. % of tannin powder with the aqueous alkali metal hydroxide solution. If the tannin powder is less than 1 wt. %, it does not gel easily. If the tannin powder exceeds 40 wt. %, the viscosity of the mixed liquid increases making it difficult to handle. The resulting solution is mixed with an aqueous aldehyde solution in the same manner as in the first method. For instance, when an aqueous solution containing 37 wt. % formaldehyde is used as the aqueous aldehyde solution, 1.39 ml of the aqueous formaldehyde solution is added to 50 ml of the aqueous solution to dissolve the tannin powder. Finally, the mixed liquid is heated in the same manner as the second, third and fourth methods to produce a stabilized gel composition.

In the sixth inventive method, substantially the same steps as in the third method are carried out except that an aqueous alkali metal hydroxide solution having a pH ranging from 7 to 10 is used instead of aqueous ammonia, to produce a stabilized gel composition. The mixing ratio of the tannin powder is the same as that in the fifth method. Hexamethylenetetramine (0.5 wt. %) is mixed with the aqueous alkali metal hydroxide solution which dissolves the tannin powder.

In the seventh inventive method, substantially the same steps as in the fourth method are carried out except that an aqueous alkali metal hydroxide solution having a pH ranging from 7 to 10 is used instead of aqueous ammonia, thereby producing a stabilized gel composition. The mixing ratio of the tannin powder is the same as that in the fifth method.

By using any of the above-mentioned seven inventive methods, the gel composition is a metal element adsorbent which is insoluble in water, acid, or alkali. The inventive metal element adsorbent obtained may be crushed to a desired size by mechanical means, such as, a mixer to increase the surface contact area.

The inventive adsorbent may be used to adsorb metals using conventional column or batch methods. In particular, the invention adsorbent can be charged into a column to thereby adsorb a metal element. Subsequently, a dilute mineral acid can be passed through the adsorbent in the column to which to elute the metal from the adsorbent. An adsorbent which has adsorbed a metal element can also be added to a dilute mineral acid and agitated, thereby eluting the metal element from the adsorbent. Nitric acid, hydrochloric acid, sulfuric acid, and the like are used as the mineral acid.

In contrast to kaki-shibu, the condensed tannin which is used as the raw materials of the adsorbent in the invention is made from a variety of natural products. This provides for an effective use of resources. In addition, since the tannin is inexpensive and easy to obtain, and is converted to the inventive metal element adsorbent with only a few preparatory steps, it is well suited for mass production, and is thus economically advantageous.

The inventive adsorbent exhibits excellent adsorption ability. Also, the inventive adsorbent exhibits improved "permeability" or "flow resistivity" when packed in a column compared to conventional insoluble tannin consisting of an aggregate of finely divided particles.

The inventive adsorbent exhibits especially excellent adsorption ability for a variety of metal elements which include uranium and thorium, which are generated from a nuclear fuel manufacturing process; the uranium which is in sea water, the transuranium elements generated from the fuel reprocessing process, such as, curium, americium, neptunium, and plutonium, heavy metal elements, such as, cadmium, lead, hexavalent chromium, mercury, iron, cobalt, the cesium, and strontium. As a result, the inventive adsorbent is useful for a broad spectrum of areas.

Further, used inventive adsorbent having adsorbed metal elements therein does not generate poisonous gases, on incineration and the volume of adsorbent can be greatly decreased by incineration, thereby reducing the yield of the solid waste. Depending upon the kind of the metal element adsorbed by the adsorbent of this invention, a solid waste can be obtained containing a pure metal oxide from which is possible to reclaim the metal.

Additionally, since the inventive adsorbent is a gel composition with high mechanical strength, it is resistant to collapse even if it is in contact with a dilute mineral acid. As a result, the metal element adsorbed in the adsorbent can be easily eluted from the gel composition to recover and purify the metal.

The present invention is described in greater detail with reference to the following examples, although it is not limited thereto.

EXAMPLE 1

8 gm of wattle tannin powder corresponding to a condensed tannin powder Were dissolved in 50 ml of 13.3N aqueous ammonia. To the resulting solution 57 ml of an aqueous solution containing 37 wt. % formaldehyde were added, followed by stirring for uniform mixing. When this stirring was stopped, a gel composition formed. The gel composition was divided in two equal parts. One of the parts was allowed to stand for four days at room temperature to age it. The second part was heated at 70° C. for one hour. Thus, two kinds of metal element adsorbents were obtained, each consisting of a stabilized gel composition. The second metal element adsorbent was used in adsorption tests 1 to 14 which will be described hereinafter.

EXAMPLE 2

50 ml of 13.3N aqueous ammonia were mixed with 57 ml of an aqueous solution containing formaldehyde 37 wt. %. 8 gm of wattle tannin powder was added to and dissolved in the resulting liquid. The solution thus formed were heated at 70° C. for one hour. As a result, gelatinization and stabilization were done at the same time to thereby provide a metal element adsorbent in the form of a stabilized gel composition.

EXAMPLE 3

8 gm of wattle tannin powder were added to 107 ml of ph 8.5 aqueous ammonia to dissolve it. Since the pH of the resulting solution gradually decreases in proportion to the addition of the tannin powder, aqueous ammonia was appropriately added to keep the pH of the solution at 8 or more. 1.5 gm of hexamethylenetetramine powder were added to the resulting solution. This solution was heated at 70° C. for three hours. As a result, gelatinization and stabilization were done at the same time to thereby provide a metal element adsorbent in the form of a stabilized gel composition.

EXAMPLE 4

1.5 gm of hexamethylenetetramine powder were dissolved in 107 ml of pure water. 8 gm of wattle tannin powder were added to and mixed into the resulting aqueous solution. At this point, the tannin was not dissolved. Aqueous ammonia was added to the resulting mixture so that the mixed liquid had a pH 8 or more, thereby dissolving the tannin therein. The mixture was then heated at 70° C. for three hours. As a result, gelatinization and stabilization were done at the same time to thereby provide a metal element adsorbent in the form of a stabilized gel composition.

EXAMPLE 5

8 gm of wattle tannin powder were added to and dissolved in 50 ml of pH 8.7 aqueous NaOH solution. Since the pH of the resulting solution gradually decreases in proportion to the addition of the tannin powder, an aqueous NaOH solution was appropriately added to the resulting solution again so that the pH of the solution could be maintained at 8. 2.77 ml of an aqueous solution containing formaldehyde 37 wt. % were added to the resulting solution. The resulting solution was then heated at 70° C. for one hour. As a result, gelatinization and stabilization were done at the same time to thereby provide a metal element adsorbent in the form of a stabilized gel composition.

EXAMPLE 6

8 gm of wattle tannin powder were added to and dissolved in 50 ml of ph 8.5 aqueous NaOH solution. Since the pH of the resulting solution gradually decreases in proportion to the addition of the tannin powder, an aqueous NaOH solution was appropriately added to the resulting solution again so that the pH of the solution could be maintained at 8. 1.0 g of hexamethylenetetramine powder was added to the resulting solution. This was then heated at 70° C. for one hour. As a result, gelatinization and stabilization were done at the same time to thereby provide a metal element adsorbent in the form of a stabilized gel composition.

EXAMPLE 7

1.0 gm of hexamethylenetetramine powder was added to and dissolved in 50 ml of pure water. To the resulting aqueous solution 8 gm of wattle tannin powder were added. This mixture was then uniformly mixed. At this point, the tannin was not dissolved. An aqueous NaOH solution was added to the resulting mixture to bring the pH of the mixed liquid to 7, thereby dissolving the tannin. The mixture was then heated at 70° C. for one hour. As a result, gelatinization and stabilization were done at the same time to thereby obtain a metal element adsorbent in the form of a stabilized gel composition.

COMPARATIVE EXAMPLE 1

8 gm of wattle tannin powder were dissolved an aqueous solution containing 37 wt. % formaldehyde. 14 ml or more of 13.7N aqueous ammonia were added to the resulting solution to precipitate the resulting tannin compound. This mixture was then filtered. The separated precipitate was allowed to stand for 4 days at room temperature for aging, thereby obtaining a metal element adsorbent consisting of an insoluble tannin having a particle size in the range of about 1.0 to 2.4 mm.

ADSORPTION TEST 1

The metal element adsorbents obtained from Examples 1 to 4 were crushed into a particle size in the range of about 1.0 to 2.4 mm by means of a mixer so that they had the same particle size as that of the adsorbent of Comparative Example 1. The following tests for adsorption of uranium were conducted using metal element adsorbents obtained in Examples 1 to 7 and Comparative Example 1.

Five 250 ml solutions, each with a uranium concentration of 200 ppb and a pH of 4, were individually charged into each of five vessels, respectively. 25 mg (dry weight) samples of each of the metal element adsorbents produced in the Examples 1 to 4 and the Comparative Example 1, respectively, were added to each of the solutions. The solutions were stirred for about two hours to adsorb the uranium to each adsorbent, so that the respective uranium adsorption rates could be measured.

In addition, further tests for uranium adsorption rates were conducted in the same manner as above except that the pH of the solutions containing the uranium was varied. In runs which used the adsorbents produced in Examples 1 to 4, the pH of the solutions was adjusted to 6, 8 and 10, respectively. In runs which used the adsorbent produced in the comparative Example 1, the pH of the solution was adjusted to 7 and 9.5, respectively. The results are shown in FIG. 1, wherein $\alpha$ stands for an adsorption rate which is calculated from the following formula.

$$\alpha = [(C_o - C_t)/C_o] \times 100(\%)$$

wherein $C_o$ represents the uranium concentration of the starting liquid before adding an adsorbent thereto, and $C_t$ represents the uranium concentration of the solution after adsorbing the uranium by adding an adsorbent thereto.

As shown clearly in FIG. 1, all of the adsorbents consisting of the gel compositions produced in the Examples 1 to 4 had a high uranium adsorption rate over a wide range of a pH of 4 to 10. This was also the case for the adsorbent of the comparative Example 1. None of the examples exhibit any difference in adsorption ability due to the preparing method and the shape thereof.

ADSORPTION TEST 2

The metal element adsorbents obtained from the Examples 5 to 7 were crushed into a particle size of about 1.0 to 2.4 mm by means of a mixer. The following uranium adsorption tests were conducted regarding these metal element adsorbents.

Three 250 ml solutions (1-3), each with a uranium concentration of 245 ppb and a pH of 4 were individually charged into each of three vessels, respectively. 25 mg samples (dry weight) of the metal element adsorbents produced in the Examples 5 to 7, respectively, were individually added to the solutions (1-3). The solutions were stirred for about two hours to adsorb the uranium to each adsorbent so that the respective uranium adsorption rates could be measured. The results are shown in FIG. 2.

Figure 2:
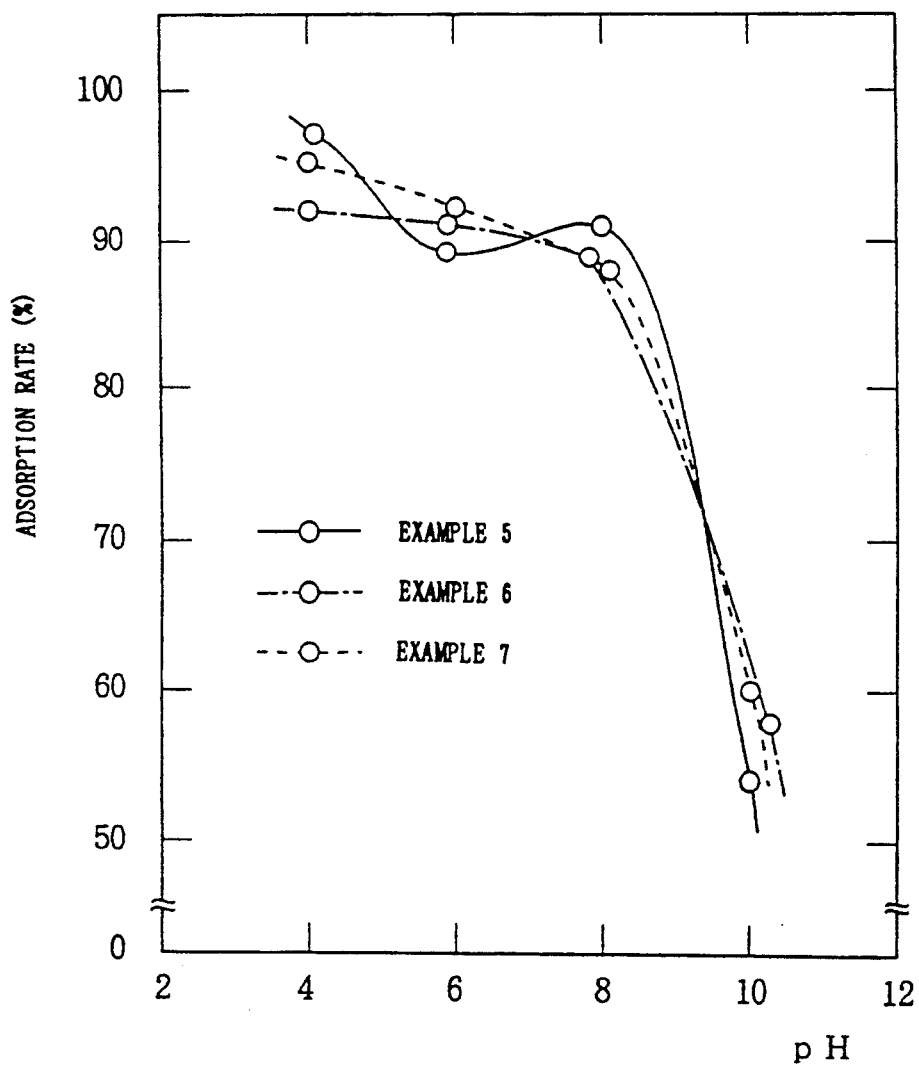
FIG. 2 is a graph showing the result of adsorption test 2 according to this invention.

As shown clearly in FIG. 2, all of the adsorbents consisting of the gel compositions produced in Examples 5 to 7 had a high uranium adsorption rate over a wide pH range.

ADSORPTION TEST 3

Figure 3:
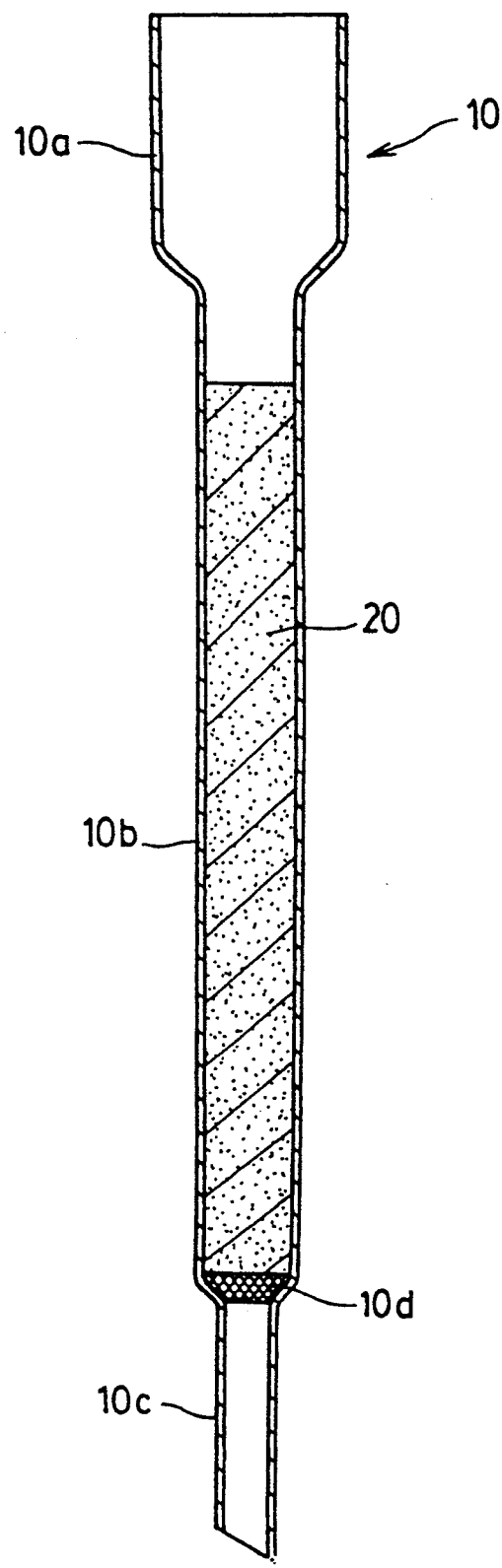
FIG. 3 is a sectional view of the column used in adsorption test 3 according to this invention.

The metal element adsorbent obtained from Example 1 was crushed into a particle size in the range of about 1.0 to 2.4 mm, followed by packing it into column 10 shown in FIG. 3. The column had an inner diameter of 50 mm at inlet part 10a, an inner diameter of 10 mm at middle part 10b, and an inner diameter of 4 mm at outlet part 10c. The length from the upper end of the inlet to the lower end of the middle was 260 mm. Glass wool 10d was packed between the middle part 10b and the outlet part 10c. The adsorbent was packed into the column until it reached the height of 180 mm from the glass wool 10d. Similarly, the adsorbent obtained from the comparative Example 1 was likewise packed into a column having the same construction as the above.

In order to compare the flow resistivity of the column packed with the adsorbent of Example 1 with those of the column packed with the adsorbent of Comparative Example 1,500 ml of pure water was poured into each of the columns. The time for 500 ml of water to pass through the columns was measured. These flow-resistivity tests were repeated five times, each time with a fresh sample the adsorbent.

The results are set forth in Table 1, and shown that an average time for the pure water to pass through the column packed with the adsorbent of the Comparative Example 1 was 4.88 hours, whereas the average time for the pure water to pass through the column packed with the inventive adsorbent of the Example 1 was 0.85 hours. This indicates that the adsorbent of Example 1 was about 5.7 times as permeable as that of the Comparative Example.

TABLE 1

| Test No. | Example 1 | Comparative Example 1 Time (hours) |
|---|---|---|
| 1 | 0.83 | 6.25 |
| 2 | 1.00 | 2.94 |
| 3 | 0.75 | 3.52 |
| 4 | 0.89 | 5.00 |
| 5 | 0.79 | 6.67 |
| Average | 0.85 | 4.88 |

ADSORPTION TEST 4

Figure 4:
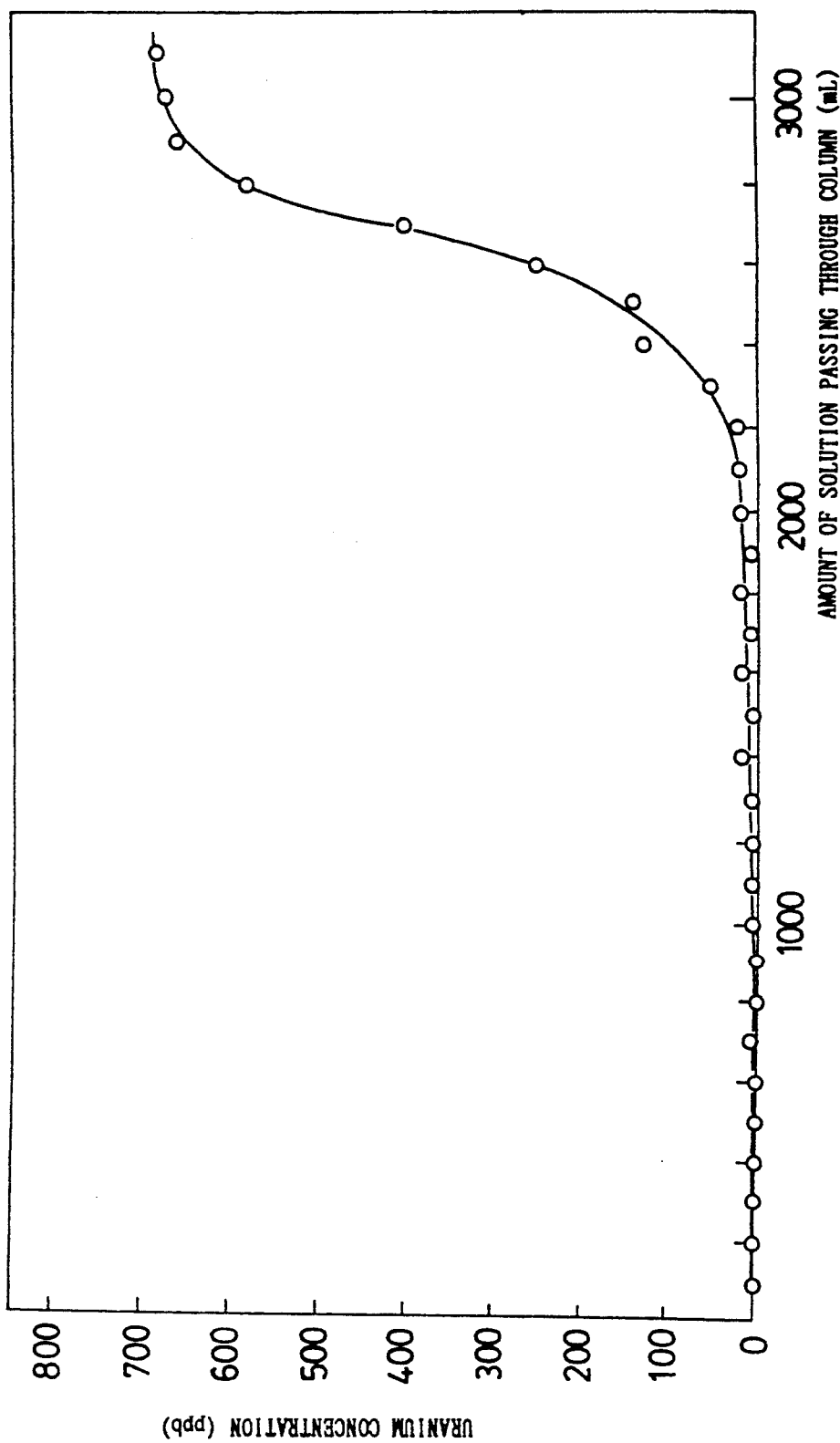
FIG. 4 is a graph showing the adsorption state of uranium in adsorption test 4 according to this invention.

The metal element adsorbent obtained from the Example 1 was crushed into a particle size in the range of about 1.0 to 2.4 mm and packed into a column having an inner diameter of 4 mm at the middle part. The adsorbent was packed into the column to a height of 80 mm from the bottom of the middle part. A solution of pH 4 having a uranium concentration of 680 ppb was passed through the column at a space velocity (SV) of 62.5 h$^{-1}$. The uranium concentration of the solution which passed through the column was measured at regular time intervals. FIG. 4 shows the results. As can be seen from FIG. 4, the uranium concentration of the solution passing through the column was one-tenth or less than that of the starting liquid until about 2300 ml of the solution had passed through the column. Thus, adsorbent treated about 2,300 times its volume of the uranium containing solution, since the volume of the adsorbent packed into the column was 1 ml ($0.2^2 \times \pi \times 0.8$). This is indicative of uranium adsorption of the inventive adsorbent of Example 1.

Figure 5:
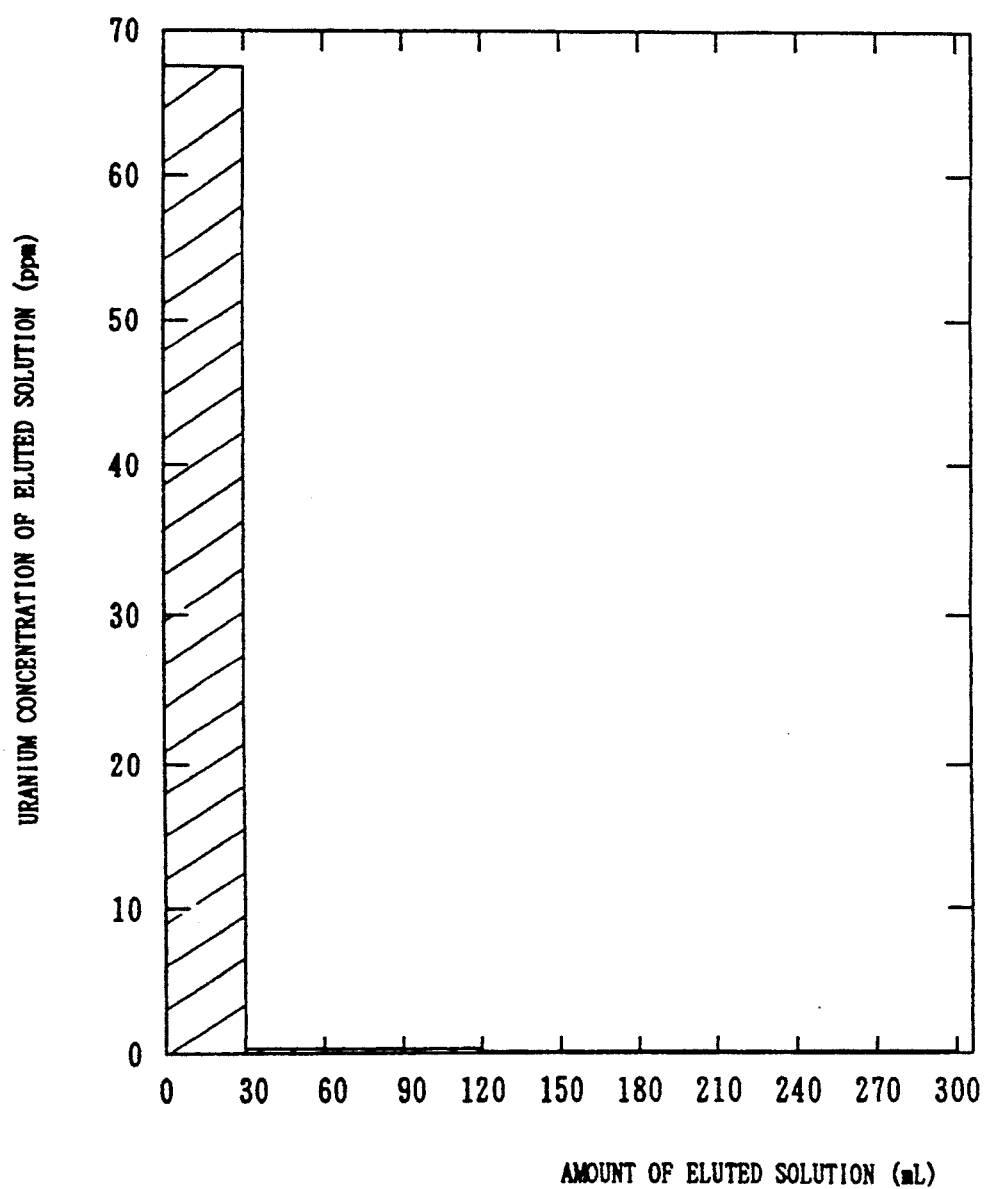
FIG. 5 is a graph showing the elution state of uranium in adsorption test 4 according to this invention.

Subsequently, 315 ml of 0.1N nitric acid was passed through the column packed with the uranium containing adsorbent in 30 to 40 ml portions so that the flow rate thereof was 150 ml/h [linear velocity(LV) =1190 cm/h; SV=149 h$^{-1}$]. The results are set forth in Table 2 and FIG. 5. As shown, about 99% of the uranium was eluted from the column with the first 30 ml of dilute nitric acid. Subsequently, the uranium concentration of the eluting solution gradually decreased as the dilute nitric acid passed through the column, and finally about 100% of the uranium was eluted. This indicates that uranium can be easily eluted from the absorbent obtained from Example 1.

TABLE 2

| Test No. | Amount of eluted solution (ml) | Uranium concentration of eluted solution (ppb) | Uranium content of eluted solution (ng) | Elution rate (%) |
|---|---|---|---|---|
| 1 | 30 | 67000 | 2010 | 99.043 |
| 2 | 30 | 225 | 6.75 | |
| 3 | 30 | 110 | 4.4 | |
| 4 | 30 | 120 | 3.6 | |
| 5 | 30 | 58 | 1.74 | |
| 6 | 30 | 26 | 0.91 | |
| 7 | 30 | 25.5 | 0.769 | |
| 8 | 30 | 17 | 0.51 | |
| 9 | 30 | 16 | 0.48 | |
| 10 | 30 | 9 | 0.27 | |
| TOTAL | 300 | — | 2029.425 | — |

ADSORPTION TEST 5

The metal element adsorbent obtained from Example 1 was crushed in the same manner as adsorption test 3, and then packed into the same column as the adsorption test 3. A solution having a thorium concentration of $8.5 \times 10^{-1}$ Bq/cm$^3$ was passed through the column. After about 2300 ml of the solution were passed through, the thorium concentration in the effluent solution was measured. The thorium concentration was found to be $5.0 \times 10^{-2}$ Bq/cm$^3$ or less. This indicates that 94% or more of the thorium was adsorbed in the adsorbent of Example 1.

ADSORPTION TEST 6

The metal element adsorbent obtained from Example 1 was crushed in the same manner as adsorption test 3. 4 mg (dry weight) of the adsorbent thus crushed was collected and added to 1000 ml of natural seawater, having a uranium concentration of 5.35 ppb and a pH of 7.7. The resulting liquid was stirred for 24 hours so that the adsorbent could adsorb the uranium. The stirred liquid was filtered through filter paper (Toyo Filter Paper No.6), and the uranium concentration of the filtrate was measured. The uranium concentration was found to be 1.00 ppb. This indicates that 81% of uranium was adsorbed in the adsorbent. The adsorbed amount per gram of the adsorbent was found to be 1088 micrograms within the 24 hour period.

ADSORPTION TEST 7

Figure 6:
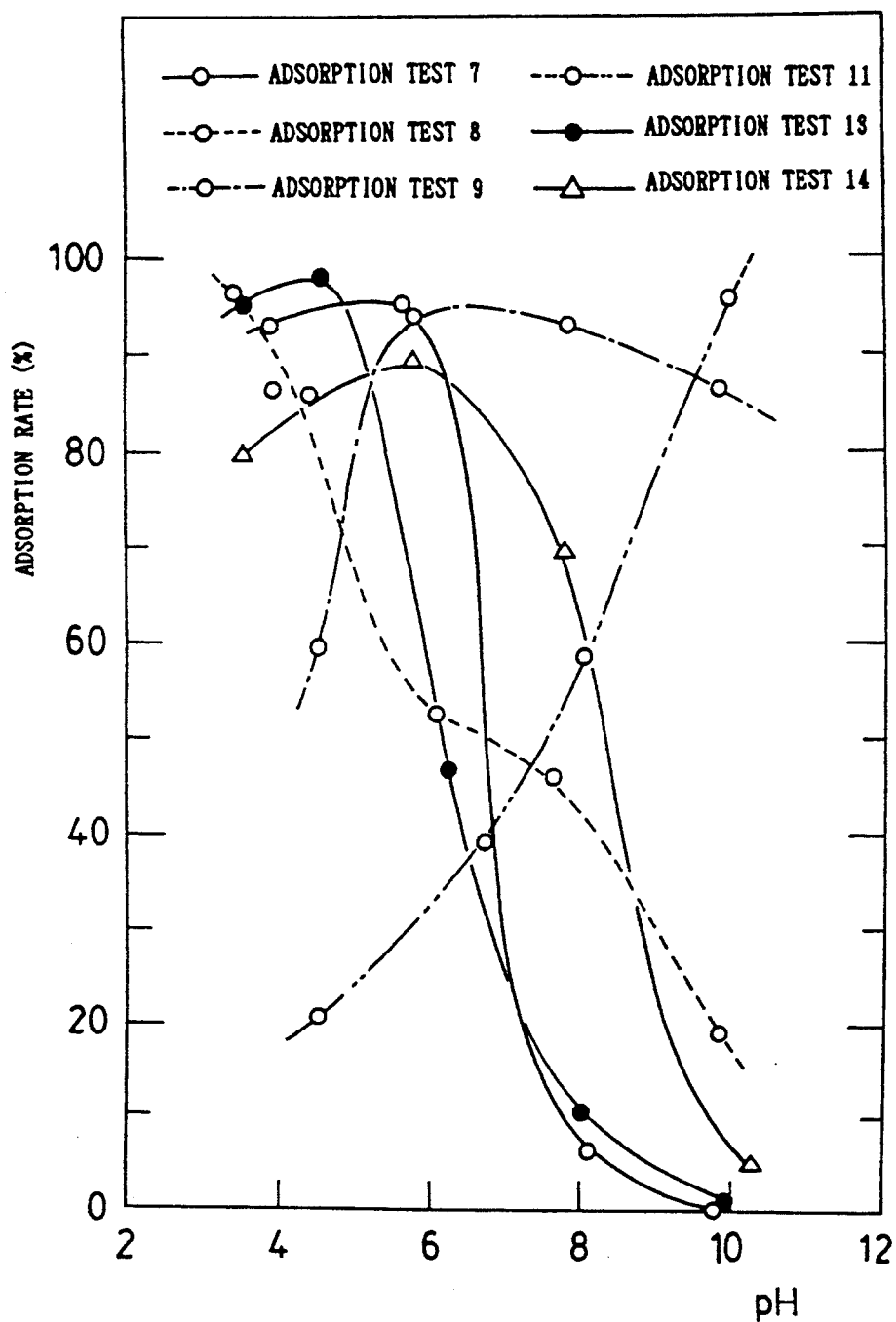
FIG. 6 is a graph showing the result of adsorption tests 7 to 9, 11, 13, and 14 according to this invention.

The metal element adsorbent obtained from Example 1 was crushed in the same manner as adsorption test 3. 100 mg (dry weight) of the adsorbent thus crushed were collected and added to four kinds of 200 ml solutions containing curium ($^{244}$Cm) at a concentration of $2.9 \times 10^{-1}$ Bq/cm$^3$. The solutions had four pH levels in the range of about 4 to 10. Each of the solutions was stirred for two hours to adsorb the curium. The final amounts of curium were measured to determine the curium adsorption rates. FIG. 6 shows the results. As shown in FIG. 6, the adsorbent exhibited high adsorption rates in acidic solutions.

ADSORPTION TEST 8

The metal element adsorbent obtained from Example 1 was crushed in the same manner as adsorption test 3. 100 mg (dry weight) of the adsorbent thus crushed were collected and added to six kinds of 200 ml solutions containing americium ($^{241}$Am), at a concentration of $1.6 \times 10^{-1}$ Bq/cm$^3$. The solutions had six different pH levels in the range of about 3 to 10. Each of the solutions was stirred for two hours to adsorb the americium. The respective americium adsorption rates were thereby measured. FIG. 6 shows the results. As shown clearly in FIG. 6, the adsorbent showed high adsorption rates with increasing acidity.

ADSORPTION TEST 9

The metal element adsorbent obtained from Example 1 was crushed in the same manner as adsorption test 3. 100 mg (dry weight) of the adsorbent thus crushed were collected and added to four kinds of 20 ml solutions containing neptunium ($^{237}$Np), at a concentration of $5.5 \times 10^{-1}$ Bq/cm$^3$. The solutions had four different pH levels in the range of about 4 to 10. Each of the solutions was stirred for two hours to adsorb neptunium. The respective neptunium adsorption rates were thereby measured. FIG. 6 shows the results. As shown in FIG. 6, the adsorbent showed high adsorption rates when the pH of the solution was 6 or more.

ADSORPTION TEST 10

The metal element adsorbent obtained from Example 1 was crushed in the same manner as adsorption test 3. 25 mg (dry weight) of the adsorbent thus crushed were collected and added to 50 ml of a solution having a plutonium concentration of $1.1 \times 10^{-5}$ Bq/cm$^3$ and a pH of 6. The solution was stirred for two hours to adsorb the plutonium. The stirred liquid was filtered, and the filtrate was measured for plutonium concentration. The plutonium concentration was found to be $1.0 \times 10^{-6}$ Bq/cm$^3$. This indicates that about 90% of plutonium was adsorbed in the adsorbent.

ADSORPTION TEST 11

The metal element adsorbent obtained from Example 1 was crushed in the same manner as adsorption test 3. 500 mg (dry weight) of the adsorbent thus crushed were collected and added to four kinds of 250 ml solutions containing cadmium, each having a cadmium concentration of 100 ppm. The solutions had four different pH levels in the range of about 4 to 10. Each of the solutions was stirred for three hours to adsorb the cadmium. The solutions were measured for their cadmium content to determine their respective cadmium adsorption rates of cadmium. FIG. 6 shows the results. As shown in FIG. 6, the adsorbent showed high adsorption rates with increasing alkalinity.

ADSORPTION TEST 12

The metal element adsorbent obtained from Example 1 was crushed in the same manner as adsorption test 3. 250 mg (dry weight) of the adsorbent thus crushed were collected and added to 125 ml of a solution having a lead concentration of 100 ppm and having a pH of 6. The solution was stirred for one hour to adsorb the lead. The stirred solution was filtered, and the lead concentration of the filtrate was measured. The lead concentration was found to be 8.1 ppm. This indicates that about 92% of the lead was adsorbed in the adsorbent.

ADSORPTION TEST 13

The metal element adsorbent obtained from Example 1 was crushed in the same manner as adsorption test 3. 250 mg (dry weight) of the adsorbent thus crushed were collected and added to five kinds of 125 ml solutions containing chromium(VI)(CrO$_3$) at a concentration of 100 ppm. The solutions had five different pH levels in the range of about 3.5 to 10. Each of the solutions was stirred for three hours to adsorb the chromium. The respective chromium adsorption rates were thereby measured. FIG. 6 shows the results. As shown in FIG. 6, the adsorbent showed high adsorption rates with increasing acidity.

ADSORPTION TEST 14

The metal element adsorbent obtained from Example 1 was crushed in the same manner as adsorption test 3. 250 mg (dry weight) of the adsorbent thus crushed were collected and added to four kinds of 125 ml solutions containing mercury at a concentration of 10 ppm. The solutions had four different pH levels in the range of about 3.5 to 10. Each of the solutions was stirred for two hours to adsorb the mercury. The mercury adsorption rates were thereby measured. FIG. 6 shows the results. As shown in FIG. 6, the adsorbent showed high adsorption rates at a pH of about 6.

ADSORPTION TEST 15

The metal element adsorbent obtained from Example 1 was crushed in the same manner as adsorption test 3. 2000 mg (dry weight) of the adsorbent thus crushed were collected and added to 1000 ml of a solution having an iron concentration of 1 ppm and having a pH of 4. The solution was stirred for one hour to adsorb the iron. The stirred solution was filtered, and the filtrate was measured for iron concentration. The iron concentration was found to be 0.01 ppm or less. This indicates that 99% or more of the iron was adsorbed in the adsorbent. The adsorbed amount per gram of the adsorbent was found to be 495 micrograms a day.

ADSORPTION TEST 16

Figure 7:
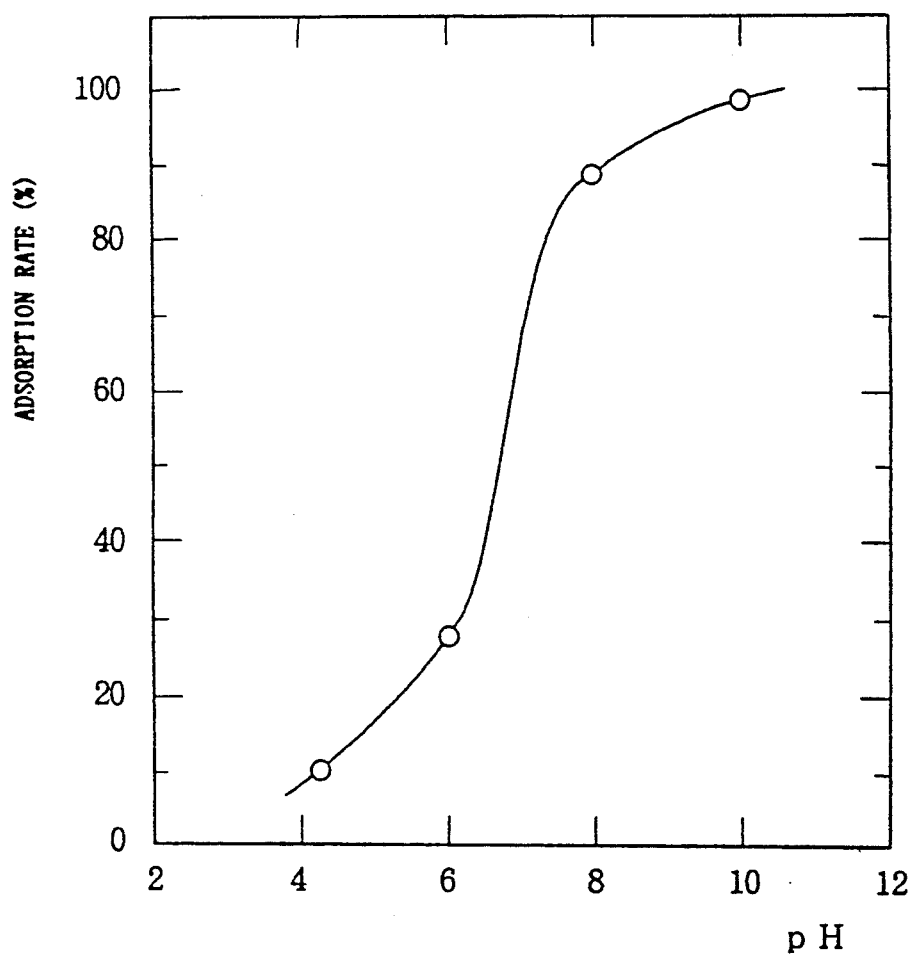
FIG. 7 is a graph showing the result of adsorption test 16 according to this invention.

The metal element adsorbent obtained from Example 1 was crushed in the same manner as adsorption test 3. 200 mg (dry weight) of the adsorbent thus crushed were collected and added to four kinds of 100 ml cobalt chloride(CoCl$_2$) solutions containing cobalt concentration of 100 ppm. The solutions had four different pH levels in the range of about 4 to 10. Each of the solutions was stirred for three hours to adsorb the cobalt. The respective cobalt adsorption rates were thereby measured. FIG. 7 shows the results. As shown in FIG. 7, the adsorbent showed high adsorption rates with increasing alkalinity.

ADSORPTION TEST 17

The metal element adsorbent obtained from Example 1 was crushed in the same manner as adsorption test 3. 400 mg (dry weight) of the adsorbent thus crushed were collected and added to 100 ml of a strontium nitrate [Sr(NO$_3$)$_2$] solution having a strontium concentration of 100 ppm and having a pH of 10. The solution was stirred for three hours to adsorb the strontium. The solution was then measured to determine the amount of strontium thus adsorbed. 16 mg of strontium per gram of the adsorbent was adsorbed, indicating a high adsorption ability.

ADSORPTION TEST 18

The metal element adsorbent obtained from Example 1 was crushed in the same manner as adsorption test 3. 400 mg (dry weight) of the adsorbent thus crushed were collected and added to 100 ml of a cesium nitrate (CsNO$_3$) solution having a cesium concentration of 10 ppm and having a pH of 10. The solution was stirred for three hours to adsorb the cesium. The solution was then measured to determine the amount of cesium thus adsorbed. 798 micrograms of cesium per gram of the adsorbent was adsorbed, indicating high adsorption ability.

What is claimed is:

1. A method for preparing a metal element adsorbent comprising dissolving a condensed tannin powder in aqueous ammonia, mixing the resulting solution with an aqueous aldehyde solution to form a gel composition, and aging the gel composition to stabilize it.

2. The method of claim 1 wherein the aging is carried out by allowing the gel composition to stand at room temperature for period of time sufficient to stabilize it.

3. The method of claim 2 wherein the aging is carried out by treating the gel composition at a temperature above room temperature for a period time sufficient to stabilize it.

4. A method for preparing a metal element adsorbent comprising mixing aqueous ammonia with an aqueous aldehyde solution, dissolving a condensed tannin powder in the mixed liquid, and heating the resulting solution at a temperature above room temperature for a period of time sufficient to stabilize it in the form of a gel.

5. A method for preparing a metal element adsorbent comprising dissolving a condensed tannin powder in aqueous ammonia having a pH of 8 or more, mixing the resulting solution with hexamethylenetetramine, and heating the mixed liquid at a temperature above room temperature for a period of time sufficient to stabilize it in the form of a gel.

6. A method for preparing a metal element adsorbent comprising mixing a condensed tannin powder with an aqueous hexamethylenetetramine solution, adding aqueous ammonia to the mixed liquid to adjust the pH of the mixed liquid to at least 8 and dissolve the tannin powder, and heating the resulting solution at a temperature above room temperature for a period of time sufficient to form a stabilized gel composition in the form of a gel.

7. A method for preparing a metal element adsorbent comprising dissolving a condensed tannin powder in an aqueous alkali metal hydroxide solution having a pH of 7 to 10, mixing the resulting solution with an aqueous aldehyde solution, and heating the mixed liquid at a temperature above room temperature for a period of time sufficient to form a stabilized gel composition.

8. A method for preparing a metal element adsorbent comprising dissolving a condensed tannin powder in an aqueous alkali metal hydroxide solution having a pH of 7 to 10, mixing the resulting solution with hexamethylene-tetramine, and heating the mixed liquid at a temperature above room temperature for a period of time sufficient to form a stabilized gel composition.

9. A method for preparing a metal element adsorbent comprising dissolving a condensed tannin powder in aqueous hexamethylenetetramine solution, adding an aqueous alkali metal hydroxide solution to the mixed liquid so that the mixed liquid has a pH of 7 to 10, and dissolve the tannin powder, and heating the resulting solution at a temperature above room temperature for a period of time sufficient to form a stabilized gel composition.

10. The method according to any one of claims 7 or 8, wherein the alkali metal hydroxide is sodium hydroxide, potassium hydroxide or lithium hydroxide.

11. A metal element adsorbent obtained by the method of claim 1.

12. A metal element adsorbent obtained by the method of claim 2.

13. A metal element adsorbent obtained by the method of claim 3.

14. A metal element adsorbent obtained by the method of claim 4.

15. A metal element adsorbent obtained by the method of claim 5.

16. A metal element adsorbent obtained by the method of claim 6.

17. A metal element adsorbent obtained by the method of claim 7.

18. A metal element adsorbent obtained by the method of claim 8.

19. A metal element adsorbent obtained by the method of claim 9.

20. A method for separating a metal element from a solution thereof comprising contacting the solution with the adsorbent of any one of claims 11 through 19 for a time period sufficient to adsorb the metal onto the adsorbent and separating the adsorbent from the solution.

21. The method of claim 20 wherein the adsorbent is pulverized prior to the contacting step.

22. The method of claim 20 wherein the contacting step is carried out by packing the adsorbent in a tubular column, and passing the solution through the column.

23. The method of claim 20, wherein the metal element is an actinide.

24. The method according to claim 20, wherein the metal element is an element selected from the group consisting of cadmium, lead, chromium, mercury and iron.

25. The method according to of claim 20, wherein the metal element is an element selected from the group consisting of cobalt, cesium and strontium.

26. The method of claim 20, wherein the separated adsorbent is contacted with a dilute mineral acid solution to extract the metal element from the adsorbent into the acid solution.

* * * * *